United States Patent [19]
Gruber et al.

[11] Patent Number: 6,115,793
[45] Date of Patent: Sep. 5, 2000

[54] MAPPING LOGICAL CACHE INDEXES TO PHYSICAL CACHE INDEXES TO REDUCE THRASHING AND INCREASE CACHE SIZE

[75] Inventors: Andrew Gruber, Arlington; Yury Levin, Shrewsbury, both of Mass.

[73] Assignee: ATI Technologies, Inc., Thornhill, Canada

[21] Appl. No.: 09/022,245

[22] Filed: Feb. 11, 1998

[51] Int. Cl.[7] .................................................. G06F 12/10
[52] U.S. Cl. ........................... 711/133; 711/134; 711/206
[58] Field of Search ................................. 711/3, 133, 134, 711/159, 202, 206, 221

[56] References Cited

U.S. PATENT DOCUMENTS

| | | | |
|---|---|---|---|
| 5,584,002 | 12/1996 | Emma et al. ............................ | 395/403 |
| 5,630,097 | 5/1997 | Orbits et al. ............................ | 395/492 |
| 5,640,533 | 6/1997 | Hays et al. .............................. | 395/460 |
| 5,694,567 | 12/1997 | Bourekas et al. ....................... | 395/403 |
| 5,752,261 | 5/1998 | Cochcroft, Jr. ......................... | 711/133 |
| 6,049,849 | 4/2000 | Arimilli et al. ......................... | 711/133 |

*Primary Examiner*—Eddie P. Chan
*Assistant Examiner*—Kevin Verbrugge
*Attorney, Agent, or Firm*—Markison & Reckamp, P.C.

[57] ABSTRACT

A cache memory system which minimizes the latency and latency uncertainty of data memory access by allocating spare cache memories to subsequent conflicting requests, and maintaining the prior requests in a separate table until the prior request is satisfied and the prior allocated cache is free. This reallocation of physical caches to conflicting requests is effected by maintaining an index to the physical cache that is separate and distinct from the logical index associated with the requests that cause the conflict. A conventional indexed cache mechanism is employed to derive the logical index from a subset of the address of the requested data. When the same logical index occurs from data requests from different blocks of memory, the conflict is resolved by assigning a free physical cache to the latter request. The latter assignment is stored in the indexed cache table, and the former assignment is stored in a separate table until it is no longer required.

20 Claims, 5 Drawing Sheets

MAPPING LOGICAL CACHE INDEXES TO PHYSICAL CACHE INDEXES TO REDUCE THRASHING AND INCREASE CACHE SIZE

FIELD OF THE INVENTION

This invention generally relates to the use of cache memory in computer systems and more particularly to cache memory applications for image and video processing systems, database access systems, Computer Aided Design systems, and the like.

BACKGROUND OF THE INVENTION

Cache memory is used to optimize system performance by temporarily storing data in memory devices that allow for high speed access, in comparison to data retrieval from low speed memory, such as disks. Cache memory is used to mirror the data on the low speed memory so that each access to the data is effected as an access to the high speed cache memory, rather than a direct access to the low speed memory. The initial access to the data incurs the time lost to access the data from the low speed memory, but once the data is stored in the cache memory, multiple accesses to the data are via the high speed cache memory access. The cache memory is structured to mirror a block of memory, so that subsequent access to data in proximity to the initially accessed data is also via the high speed cache memory access. Cache memory is conventionally structured to provide access to multiple blocks of memory. As shown in FIG. 1, blocks C0, C1, C2, and C3 form discrete cache location areas within the overall cache memory 125.

FIG. 1 represents a conventional processing system with indexed cache memory. Blocks 110–117 represent sequential processes being applied to data, in a pipeline fashion, from a processing entity 105. At block 113, a data request 132 is initiated; the request can be either a read or a write. For ease of understanding, read access will be discussed herein; the principles discussed are applicable to write access as well, as would be evident to one of average skill in the art. As shown, block 113 initiates a data request 132, although the data requested is accessed by block 116, via an access command 134, and a data transfer 136. Such "look ahead" accesses are particularly well suited to cache memory access systems, because memories have inherent latency, and processes 114, 115, which do not use the requested data, may be performed while the data is being accessed. Non-pipelined processing may be represented by omitting blocks 114 and 115 and combining blocks 116 and 113. In such a system, efficiencies are achieved whenever the requested data is already present in the cache memory, but the time required to access the data from memory will be directly reflected in the system performance whenever a memory access is required.

Shown at the link between blocks 112 and 113 is a stream of memory access demands 150. This stream is intended to convey an example stream of requests for data within memory blocks A, J, P, C, F, J, H, etc. These requests enter the cache memory access system 120 at the cache control 160.

The cache control 160 assigns a cache location to each request. Conventional indexed cache memory access systems employ a straightforward mapping from a memory address to a cache location address, typically by assigning a portion of the memory address as the index to the cache memory. That is, for example, if the cache memory 125 consists of 16 parallel cache locations, each able to contain 1024 data elements, the lower 10 bits ($2^{10}$=1024) of the memory address will form the index to the data element within a cache location, and the next 4 bits ($2^4$=16) will identify an index to the particular cache location. The memory block 100 is shown organized as a 4 by 4 block structure, with memory blocks A, B, C, and D at row 0; E, F, G, H at row 1; etc. In this example, two bits of the memory address identify the cache location index: in FIG. 1, the row in which the memory block lies forms the location index to the cache memory 125.

Other cache assignment techniques are conventionally used, a common technique is one based upon cache latency. The assignment of a cache location to a new memory request is based upon whichever cache location has been idle the longest. Such a technique introduces additional complexities for maintaining a cache-idle record. To minimize this complexity, a combination of cache latency and cache indexing techniques is commonly employed.

With reference to the example stream 150 of FIG. 1, the first request, for block A, will be submitted to the memory 100, as a memory command 161, with instructions to store the block of data at A into cache location C0. The next request, for block J, will immediately follow this request, instructing the memory to place the block J into cache location C2. The next request, for block P, will immediately follow this request, instructing the memory to place the block P into cache location C3. These assignments are recorded in the cache table 170. Also contained in the cache table 170 is an "in-use" flag associated with each cache location. The in-use field is set when the data is requested, and cleared when the data access is completed. Initially, the in-use field for each cache location will be cleared.

As shown, upon receipt of the data from memory, cache location C0 will contain a copy of memory block A, identified as A' in FIG. 1; similarly, a copy of J, J', will be in cache location C2; and a copy of P, P', will be in cache location C3. The cache table 170 will also be utilized when the data access at process 116 is executed, for it is the cache table 170 which identifies where the data block is stored.

The next request, for block C, cannot be submitted to the memory 100, because cache location C0 is currently in-use, and it cannot be assured that the requested data at A will be removed from cache location C0 before the memory places C into the cache location C0. Thus, the process 113 must wait until the data access for A, at process 116, is completed before its request for C can be submitted. In most cases, this halt at 113 will force a halt in processes 112, 111, etc., thereby slowing the entire system. After the data access to cache location C0 is completed, as indicated by a cleared C0 in-use flag in the cache table 170, process 113's request for memory block C will be submitted by the controller 160, followed immediately by the request for memory block F, to be placed in cache location C1.

The submission of the next request, for memory block J, will be recognized by the cache controller 160 as being able to be satisfied by a cache memory access, because the cache index table 170 shows that cache location C2 contains the memory associated with J, in response to the first request for J, above. Thus, a memory request 161 for block J is not submitted to memory block 100 in response to the data request 132 for J from process 113. When this second data access to block J is executed at process 116, the cache table will still show J being assigned to cache location C2, where the copy of block J still resides. To assure that the first access to block J does not clear the in-use flag before the second access to block J occurs, a numeric variable is used as the in-use flag; this variable is incremented for each data request, and decremented after completion of each data access. A cache location is in use whenever the value of this flag is not zero.

The next request, for block H, will be submitted to the memory 100 only after the prior access to F is satisfied, and cache location C1 becomes is no longer in use.

When process 116 requests access to the data at a memory location, the cache controller 160 determines which cache location index is associated with the memory block containing the memory location. If the data has been received from the memory, via 101, in response to the previously submitted memory command 161, the data is communicated to the process 116 from the indexed cache location, via the path 126–136.

FIG. 2 shows a flowchart for a conventional cache memory access system. FIG. 2a shows a data request process, and 2b shows a data access process. The cache controller receives a request for data at a given memory address, at 200. The cache controller determines the index to the cache location associated with this memory address, at 210. It also determines whether the requested data is already located in the cache location, at 220. If it is not already in the cache location, a check is made as to whether that cache location is currently in use, at 230. This check is continually made until the cache location is not in use, as shown by the wait loop 240. If the cache location is free, the memory is accessed and the data is placed in the cache location, at 250. Note that step 250 can be a spawned process, so that the system can perform other tasks while the memory is providing the data to the indexed cache location.

When the data is in the cache location, either having been in the cache location as determined at 220, or having been accessed from memory at 250, the requesting process is provided access to the data as shown in the flowchart 2b. The request for access to data at a memory address is received, at 260. The cache location index is determined from the memory address, at 264, in the same manner as step 210 in FIG. 2a. The controller then provides access to the requested data in the indexed cache location, at 268.

To optimize the performance of a cache memory access system, the number of parallel cache locations, or cache lines, is determined in dependence upon the relative speed of access to the memory 100 and the expected nature of memory accesses. The pauses required whenever a memory request has the same index as a prior request to a different memory block occur due to latency uncertainties in the fetching of data from memory and the completion of data transfer to the using process. This uncertainty means that simple pipelining cannot be used to remove the pauses.

Using conventional queuing theory techniques, the appropriate tradeoff can be made between the costs of additional cache locations, the likelihood of causing a memory access halt, or pause, in the process, and the expected duration and impact of such a pause. Although additional cache locations will reduce the likelihood of pauses in the processing stream, conventional indexed cache memory access systems are still susceptible to certain patterns of memory access. For example, a conventional indexed cache memory access system will exhibit significant performance degradation if a number of memory requests having the same cache location index are receive in a row, regardless of the number of cache locations provided. Additional cache locations reduce the likelihood of the same cache location index assignment occurring within the memory access time, but the pause will occur whenever this event occurs.

Also, to minimize the complexity, and maximize the performance, of the cache controller, conventional indexed memory access systems use a subset of the memory address to determine the cache location index. This requires, however, that the number of cache locations is a power of 2, and improved performance requires successive doubling of the size, and cost, of cache memory. An incremental improvement cannot be effected, often forcing a design choice between insufficient cache memory and excessive cost.

Therefore, a need exists for a memory access system which is less susceptible to patterns of memory access, and a memory access system whose performance can be improved by an incremental addition of cache locations.

DETAILED DESCRIPTION OF A PREFERRED EMBODIMENT

The cache memory access system in accordance with this invention provides for a logical cache indexing mechanism that is distinct from the cache location index. The cache logical index is an index that is derived from the requested data's memory address, consistent with the conventional cache mapping discussed above. This index, however, is not the index used to identify which actual, or physical, cache location will be used. The actual cache location is identified by a cache physical index, and a table is maintained which associates each logical index with a physical index.

In accordance with this invention, more physical cache locations are provided than logical indexes. By providing for more physical cache locations than logical cache indexes, a queue of "free" cache locations can be maintained. When a memory access request is to the same cache logical index as a prior request, one of the free cache locations are allocated to this new request if the prior request is not yet completed. This allows a memory request to be submitted to the memory without waiting for prior request to be completed, thereby improving performance. When the prior request has been completed, the physical cache index is placed in the list of free cache locations available. Only when all the free cache locations have been allocated will a pause in the submission of memory requests be required.

By maintaining distinct logical and physical indexes, the logical index can be constrained to a power of 2, to allow for efficient derivation from a memory address, without requiring the number of physical cache locations to be a power of 2. That is, the performance can be enhanced by adding as few as one free cache location, or any arbitrary number of free cache locations.

The number of logical indexes will determine the likelihood of a repeated logical index within a memory access period, whereas the number of spare cache locations will determine whether repeated indexes will result in a pause. Thus, the performance of the system in accordance with this invention can be made to be substantially unaffected by patterns of memory accesses. That is, conventional cache memory access systems are susceptible to the occurrence of a singular repeated index. By providing spare cache locations, the system will only be susceptible to the occurrence of multiple repeated indexes within the memory access time, thereby providing an exponentially decreasing likelihood of having to pause because of a particular pattern of memory accesses.

Figure 3:
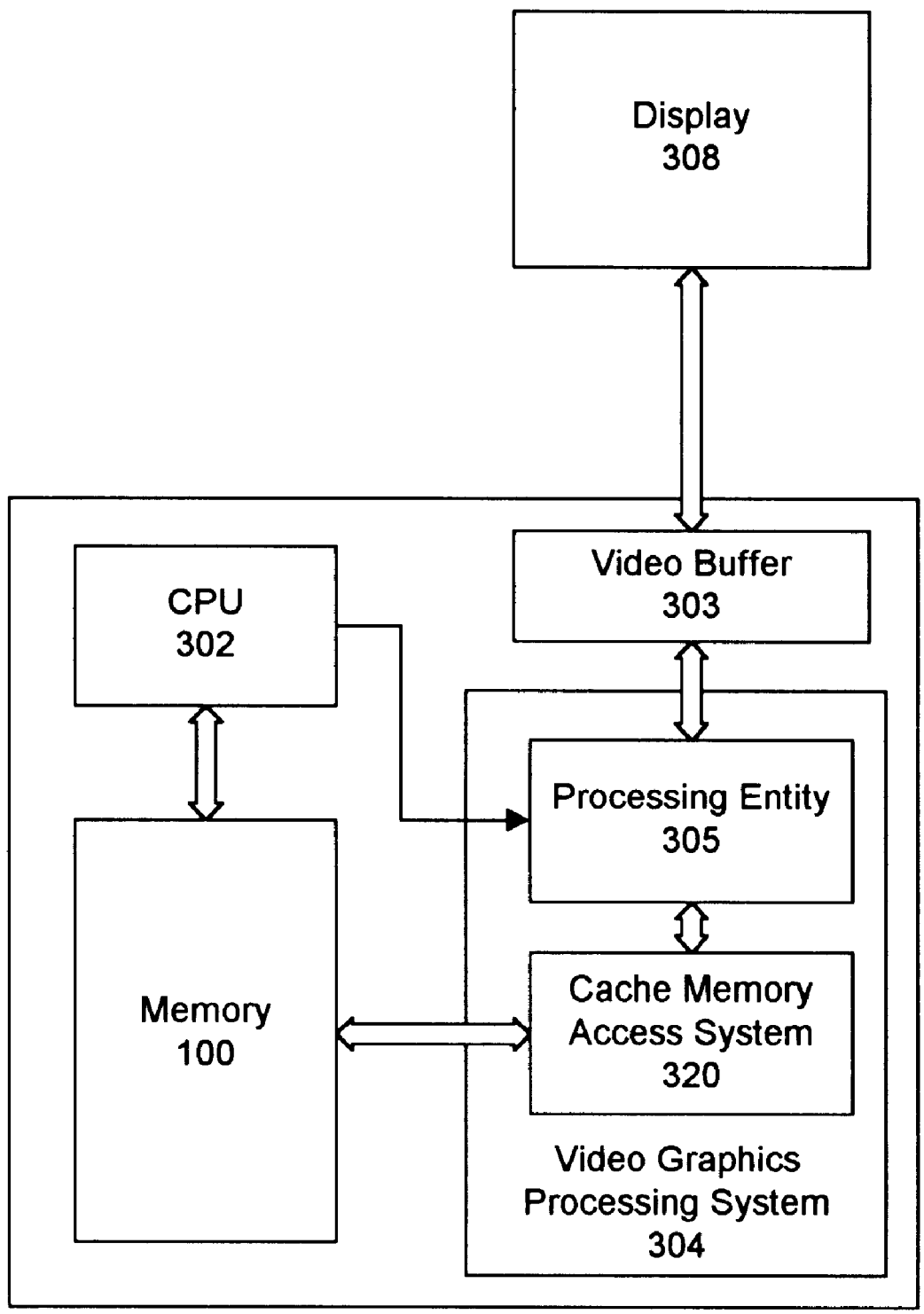
FIG. 3 illustrates a block diagram of a video graphics system.

FIG. 3 shows a system having a CPU 302, a memory 100, and a display 308. To alleviate the CPU 302 of the burden of driving the display, the CPU 302 and memory 100 are coupled to the display 308 via a video graphics processing system 304, and a video buffer 303. The CPU 302 conveys high level commands, such as "display object", to the video graphics processing system 304. The video graphics processing system 304 comprises a processing entity 305 which executes the necessary operations to retrieve the parameters of the object to be displayed and forms an array of values representing the object in the video buffer 303. The display 308 accesses the video buffer 303 to form a visual image. The video graphics processing system 304 contains a cache memory access system 320 to provide for efficient access to the memory 100, so that the video buffer 303 can be assigned the appropriate values as quickly as possible. The video graphics processing system 304 is particularly well suited for a cache memory access system in accordance with this invention, as discussed below.

Figure 4:
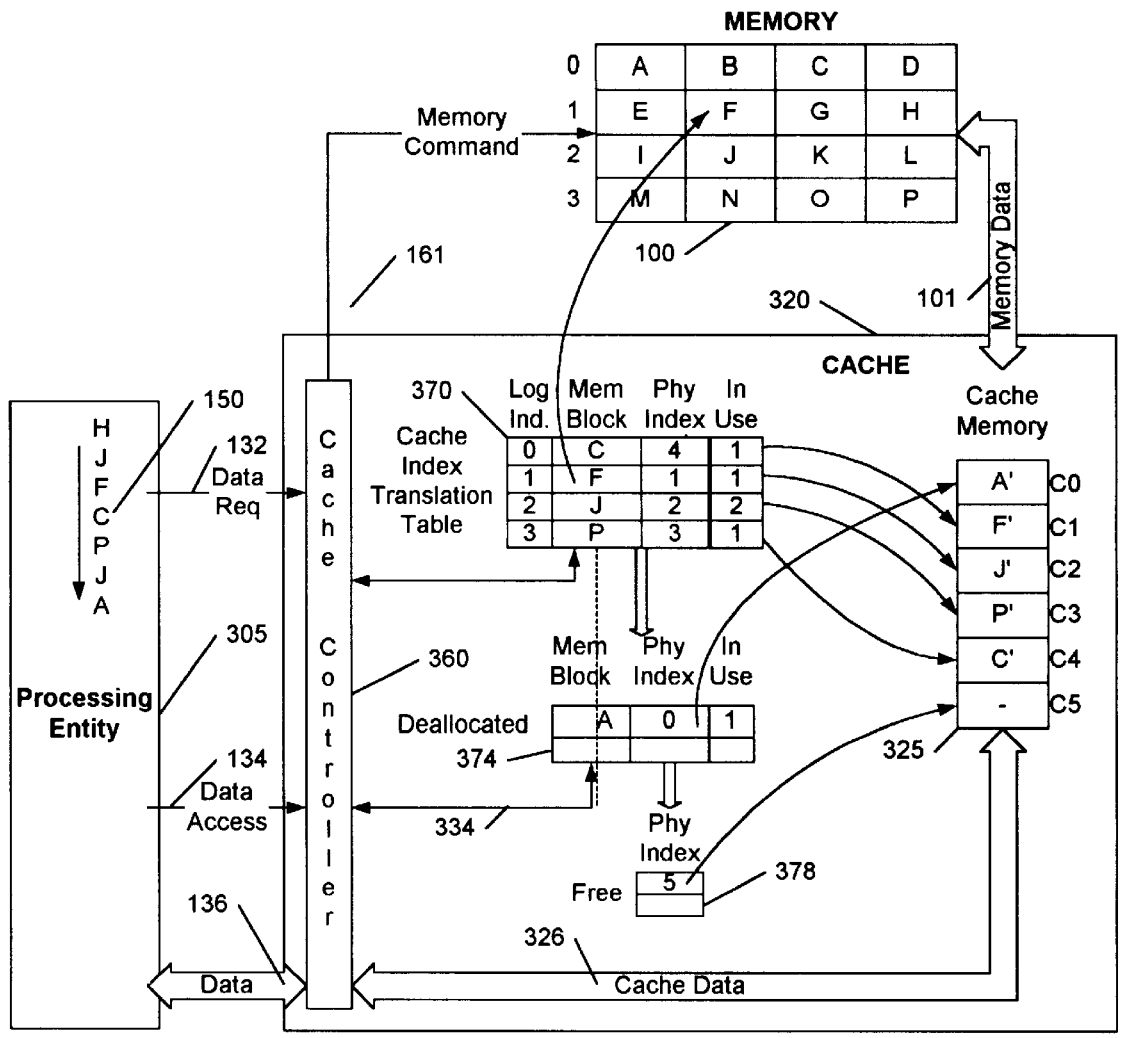
FIG. 4 illustrates a block diagram of a cache memory access system in accordance with this invention.

FIG. 4 shows a block diagram for a cache memory access system 320 in accordance with this invention. The cache memory access system 320 receives data requests from the processing entity 305. A pipeline process is not explicitly shown in the processing entity 305, because although the invention is particularly well suited to a pipeline architecture, the principles discussed herein are not dependent upon such a structure. Normally, data access is performed by the cache controller 360 in response to a data request; the separate data request line 132 and data access line 134, shown in FIG. 4 connecting the processing entity 305 with the cache memory access system 320 merely indicate that there may be a separation in time between the data request and the data access.

The cache memory 325 is separated into independent cache locations C0, C1, C2, C3, C4, and C5. When the cache controller 360 receives a data request, a logical index is determined based upon the memory address of the requested data. This logical index, however, is not an index to cache memory 325 as in FIG. 1. In accordance with this invention, and as shown in FIG. 4, there are more cache locations than logical indexes. For clarity, the term physical index will be used to describe the index to the actual, physical, cache memory 325. One physical index will be assigned to each logical index, and the excess of physical indexes will be either deallocated or free, as will be discussed below. Initially the assignment of physical indexes 0 to 3 will be to logical indexes 0 to 3, respectively; the excess physical indexes, in this example physical indexes 4 and 5, are free. The free physical indexes are stored in the free table 378. The assignment of physical indexes to logical indexes will be maintained in the cache index translation table 370. Also contained in the cache index translation table 370 is an "in-use" flag associated with each cache location. For clarity, the in-use field will be said to be associated with the physical index to the cache location. Initially, the in-use field for each physical index will be set to 0, and incremented for each data request, and decremented for each data access.

The cache memory access system 320 receives the stream of data requests 150. When the request for memory block A is received, the logical index of 0 is determined. The cache index translation table 370 will show an assignment of physical index 0 to logical index 0 and a clear (0) in-use flag. Because it is clear to use the cache location C0 indexed by physical index 0, a memory request 161 is submitted to the memory 100, indicating that a copy of block A is to be placed in cache location C0. The in-use flag for physical index 0 is incremented to 1. Data requests for blocks J and P are handled similarly, instructing the memory to place copies of J and P into cache locations C2 and C3, respectively, and the in-use flags for physical indexes 2 and 3 are incremented to 1.

The next request, for memory block C, results in a logical index of 0. The controller 360 will note that logical index 0 has physical index 0 associated with it, and that physical index 0 has its in-use flag set (non-zero). Thus, the controller 360 cannot instruct the memory 100 to store memory block C into cache location C0. In the conventional system of FIG. 1, the request would wait until cache location C0 is no longer in use. Contrarily, in accordance with this invention, one of the excess cache locations is allocated to logical index 0, and this cache location is subsequently used to receive memory block C. Also in accordance with this invention, the association of memory block A to cache location C0 must be maintained, because the subsequent data access 134 to the data in memory block A must have a means of identifying where the data is located. To maintain this association, cache location C0 is deemed to be deallocated, but not free. Deallocated table 374 is used to store the association between memory block A and physical index 0, as well as the in-use flag associated with this physical index. To provide a cache location for memory block C, the cache controller 360 removes a physical index from the free table 378, and associates it with logical index 0 and memory block C in the cache index translation table 370. In this example, free physical index 4 is allocated to logical index 0, memory block C, as shown in FIG. 4. Note that, at this point in time, the deallocated table contains the memory block address A, associated with physical index 0, and the free table contains the remaining free physical index, 5.

Figure 1:
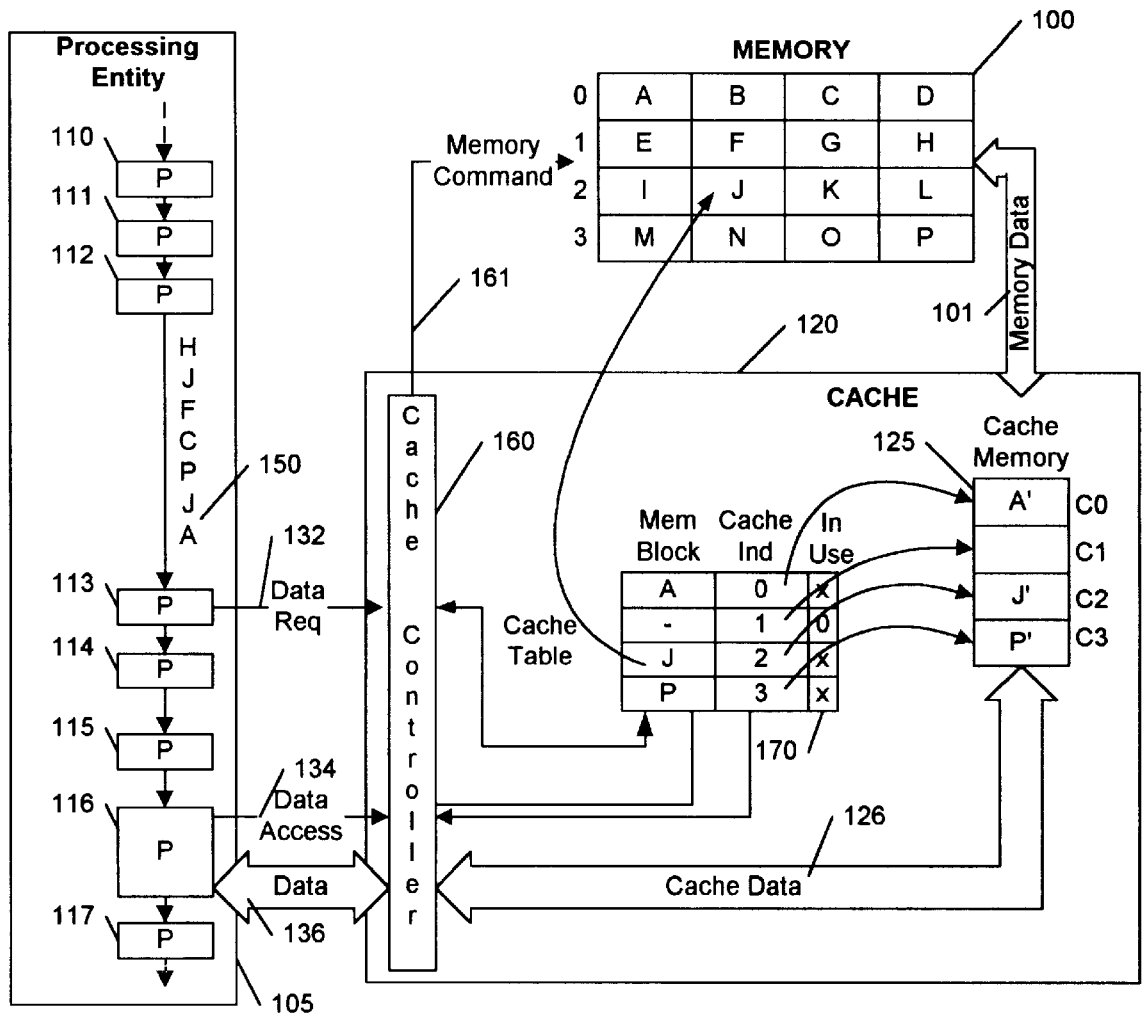
FIG. 1 illustrates a block diagram of a prior art cache memory access system.

As compared to the conventional indexed cache memory access system of FIG. 1, the allocation of free cache locations to subsequent data requests having the same index as a prior request eliminates the need to pause the processing entity. To effect this reallocation, however, the prior allocation must be maintained until the data access associated with the prior request has been completed. By distinguishing between a logical index and a physical index, and providing more physical indexes than logical indexes, substantial memory-access performance improvements can be achieved, while still retaining the efficiencies provided by an indexed cache memory access system, provided that the prior allocations are maintained until no longer needed.

The next data request 150, which is for memory block F, is effected by instructing the memory 100 to provide a copy of memory block F to the cache location C1 indexed by physical index 1. The next data request 150, for memory block J, is recognized as being satisfiable by a cache memory access, because memory block J, at logical index 2, is shown to be associated with physical index 2. Thus, cache location C2 will contain a copy of memory block J. The in-use flag will be incremented to 2, and no memory request will be sent to the memory.

Note that a block address and its associated physical index are not removed from the cache index translation table 370 unless a subsequent request for a different memory block having the same logical index is received. Thus, the method in accordance with this invention will provide the same level of cache efficiency as the conventional indexed cache memory access system for repeated accesses to the same block of memory.

When the data is ready for access by the processing entity 305, the controller 360 will search 334 both the cache index translation table 370 and the deallocated table 374 for the appropriate memory block. The data at the cache location indexed by the physical index associated with this block is then provided to processing entity 305, via paths 326 and 136. When this access is completed, the in-use flag of the accessed physical index is decremented.

When the in-use flag for a physical index in the deallocated table is clear, the physical index is placed in the free table 378, and the entry in the deallocated table 374, associating this physical index to a memory block, is removed.

Figure 2:
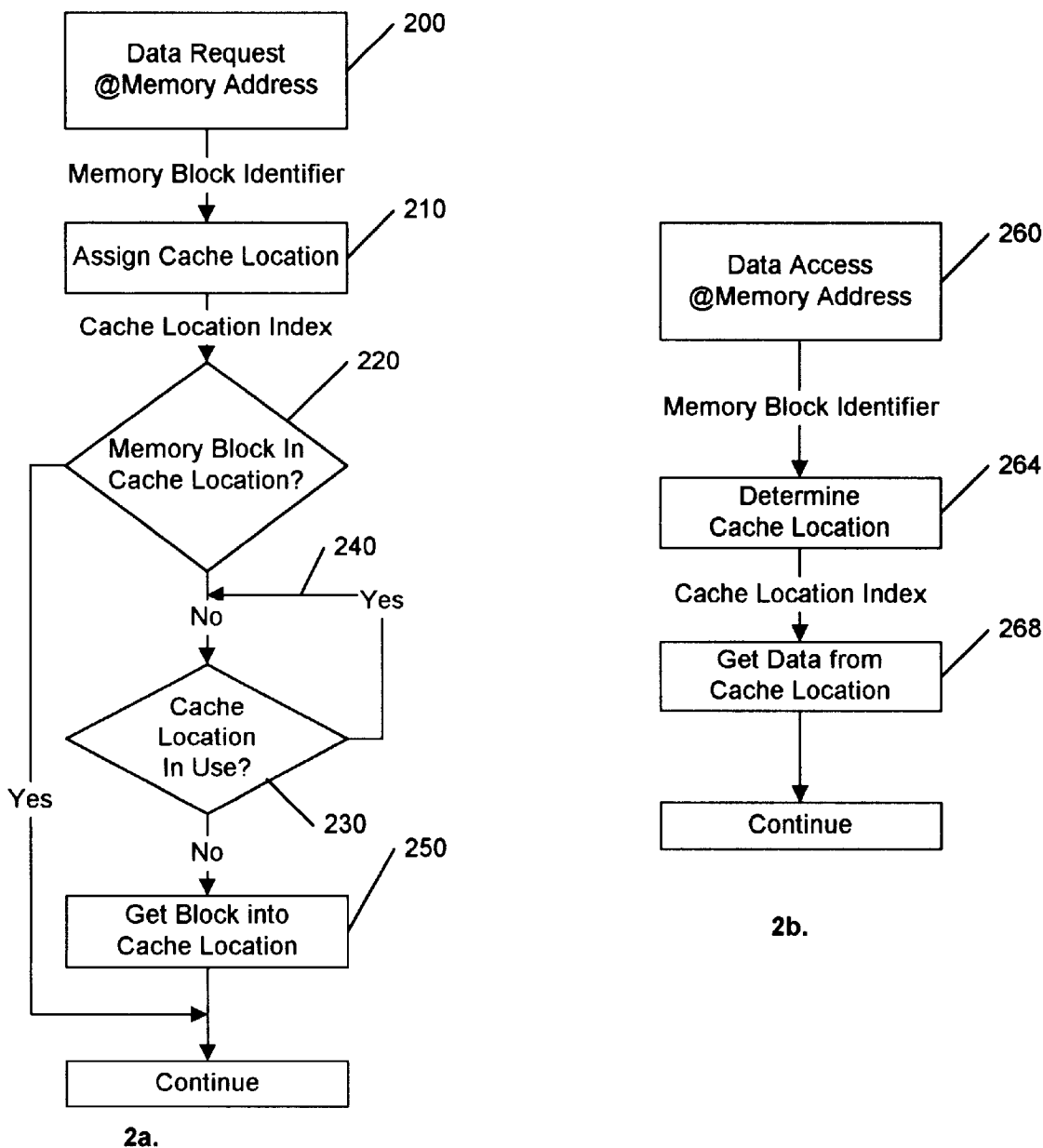
FIG. 2 illustrates two flow charts for a prior art cache memory access system.
Figure 5:
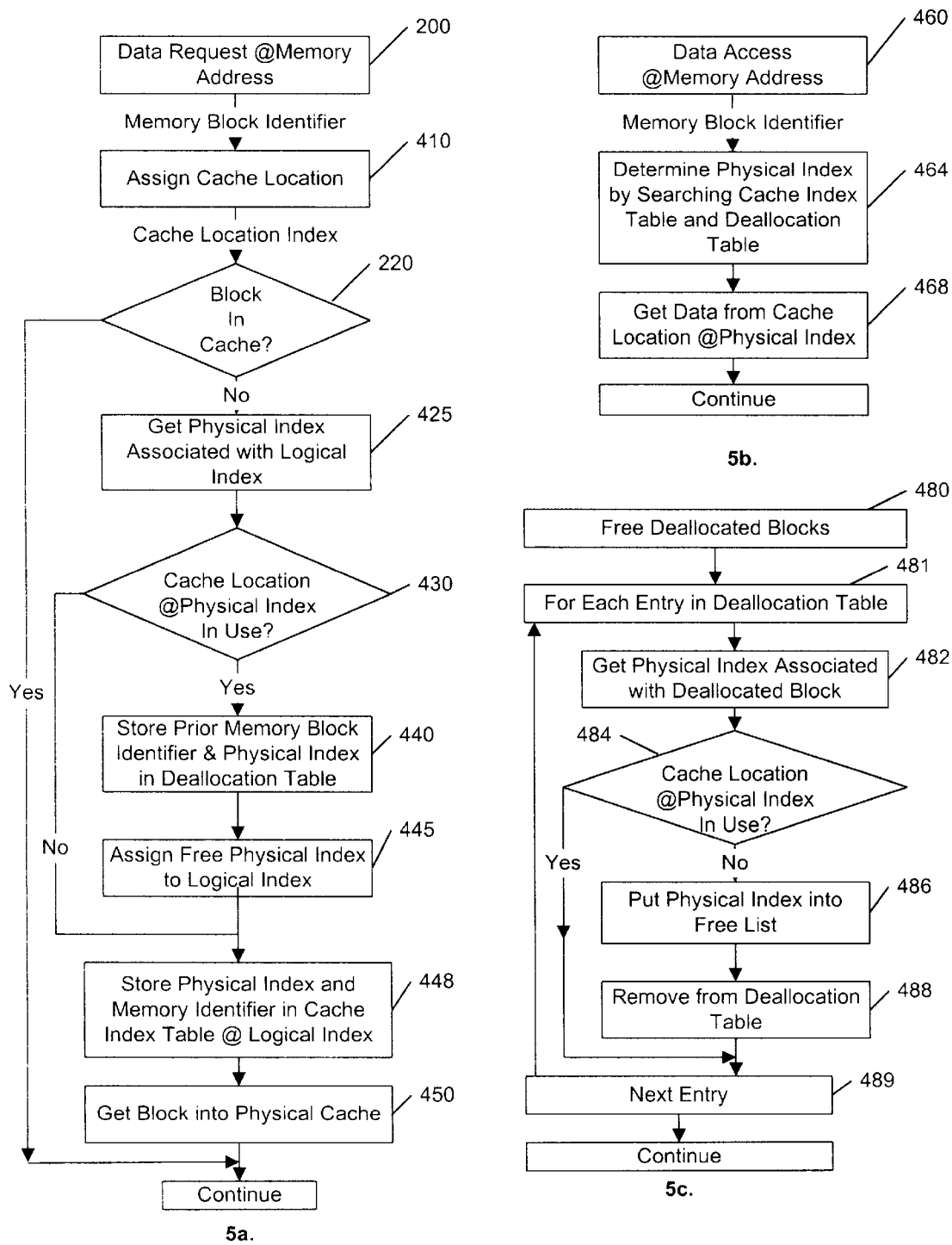
FIG. 5 illustrates three flow charts for cache memory access in accordance with this invention.

A flow chart for the cache memory access system in accordance with this invention is shown in FIG. 5. The blocks that perform similar function to those of the flow chart in FIG. 2 are identified by the use of the same reference numeral.

In FIG. 5*a*, the data request is received, at 200, and a cache logical index is determined at block 410. The result of block 410 is a logical index, rather than a direct index to a cache location. Block 220 determines whether the block is already contained in the cache memory 325. If this memory block is not already contained in the cache memory 325, the physical index associated with this logical index is obtained, at 425, and its in-use flag is checked at 430. If the previously allocated cache location indexed by this physical index is not in-use, the association of the memory block and this physical index will be stored in the cache index translation table 370 at this logical index, at 448. Block 450 copies the block of memory requested and places it into the cache location indexed by this physical index, at 450.

If the previously allocated cache location indexed by the physical index is in use, the association between this physical index and its associated memory block is stored in a deallocated table 374, at 440. At 445, a free physical index is allocated, and the association of the memory block and this physical index will be stored in the cache index translation table 370 at the logical index, at 448. A copy of the block of memory requested will be place into the cache location indexed by this physical index, at 450, as discussed above.

When data is to be accessed by the processing entity, at 460 in FIG. 5*b*, a search of both the cache index translation table 370 and the deallocated table 374 is performed at 464 to determine the physical index associated with the memory block containing the requested data. The data from the cache location having this physical index is communicated to the requesting process, at 468.

FIG. 5*c* shows a process for removing block associations from the deallocated table. Via the loop 481–489, each block in the deallocated list is assessed by retrieving its associated physical index, at 482, and checking its in-use flag, at 484. If the cache location indexed by this physical index is no longer in use, the physical index is placed in the free list, at 486, and the entry in the deallocated table is removed, at 488. This process will be called periodically, and whenever a free physical index is not available at 445. That is, block 445 will call this procedure repeatedly until a free physical index becomes available. Note that this is the only event, which causes the process to pause. Only if a repeated logical index occurs, all excess cache locations have been deallocated, and the data access to any deallocated cache location has not yet completed, will the process of FIG. 5 pause.

In accordance with this invention, any number of excess cache locations can be provided. Similar to the conventional indexed cache memory access system, the number of logical indexes will determine the likelihood of a different memory request having the same index as a previous request, and the speed of memory access will determine the likelihood of the previous request still being pending. Unlike the conventional indexed cache memory access, a pending previous request will not necessarily cause a pause until the previous request is completed. The number of spare cache locations will determine the likelihood of all spare cache locations being in-use, and thus the likelihood that a pending previous request will cause the process to pause. The likelihood of all spare cache locations being in-use is also a function of the time required to complete a data access transaction, as well as the frequency at which the data needs to be retrieved from memory.

In a pipeline processing system, the number of stages between the data request and the data access is often set so that the time between data request and data access exceeds the average memory access time. In so doing, the number of stages between the data request and the data access determines the likelihood of all spare cache locations being in use at the same time. Conventionally, all the processes in a pipeline process are in lock-step with each other; at the end of each pipeline period, the data progresses to the next process in the pipeline. Thus, for example, if there are four stages between a data request and the data access, the data access will be completed four pipeline periods after the data request. During these four pipeline periods, four other memory requests will have occurred. In a worse case scenario, these four other memory requests may be for different memory blocks having the same logical index. If four spare cache locations are provided, and the average memory access time is four pipeline periods, it is likely that the data access on the first allocated cache location will complete by the time the fifth memory request arrives, and a pause will not be required. Thus, in a preferred embodiment, the number of excess cache locations is equal to the number of pipeline stages between data request and data access. Note that this determination is independent of the number of logical indexes provided. As noted above, providing additional logical indexes, or cache lines, reduces the likelihood of a conflict in logical indexing occurring; providing additional physical indexes, on the other hand, reduces the likelihood of a logic index conflict impacting the system performance.

In a similar manner, the mode of memory access can also influence the choice of the number of spare physical indexes, i.e. spare cache locations, to provide. In conventional systems, the memory is able to process multiple memory requests at the same time. This is often referred to as the memory having multiple pipes within which the data may flow. In a worse case scenario, one would want to be assured that each pipe had a cache location to which it could provide data in response to a memory command. For example, consider a memory having 8 pipes. In a worse case scenario, multiple data requests from different memory locations will place the prior requests into the deallocated table, awaiting data access. The multiple requests will cause a pause when there are no free physical indexes available. If fewer than 8 excess physical indexes are provided, the requests will cause a pause even though one or more of the pipes from memory are not being utilized. Thus, in a preferred embodiment, the number of excess physical indexes is equal to the number of pipes available to the memory.

It will be evident to one of ordinary skill in the art that the invention presented herein is particularly well suited for video graphics processing where a large amount of memory is accessed in a very regular and predicable manner, and the speed and cost of processing is important. Video and graphic images are comprised of individual data elements forming the composite image. The data elements may contain picture information (pixels), such as the chrominance and luminance at each point in the image. The pixel values may be determined by data items reflecting the texture of the object at these points (texels), as well as whether a particular feature is visible at the current view of each point (z-buffer information). Typically, the image is processed, in sections or regions, wherein each pixel in the region is processed and determined in the same manner, one after the other. The images are typically stored in lower cost, lower speed, memories, whereas the individual regions may be mirrored to higher cost, higher speed memory while they are being processed. Because the data will be requested from the same blocks of memory corresponding to the region repeatedly, a cache memory access system is appropriate. Because the memory access is regular and predictable, a pipeline architecture is suitable, and "look ahead" data accesses are feasible. Because cost is important, an indexed cache memory access system is appropriate. Because speed is important, an indexed cache memory access system having minimal latency is required. The allocation of a spare cache location whenever a conflict in logical indexing occurs, in accordance with this invention, minimizes the likelihood that an indexing conflict will result in a pause of the processing system. Thus, this invention provides for the performance, cost, and speed advantages of an indexed cache memory access system, while also providing for minimal latency, and minimal latency uncertainty.

It will be evident to one skilled in the art that the applications of the principles presented herein are not limited to the examples given. The use of a spare cache location whenever an assignment conflict arises, coupled with the storage of the prior assignment, in accordance with this invention, is not limited to an indexed cache memory access system. Similarly, the particular scheme for deallocating a memory block need not be as described herein. A few exemplary alternative scenarios follow.

The in-use counter can be used to determine whether the prior block should be deallocated, or the new block deallocated. That is, if the in-use counter indicates repeated requests for a block, it is likely that additional requests will be forthcoming. Rather than deallocate this prior block, the new block and the free index assigned to it can be immediately stored in the deallocated table, instead of the cache index translation table.

The removal of a block from the deallocated table, FIG. 5c, may be called only on an as-required basis, for example, when the number of free indexes drops below a particular level.

The availability of 'spare' physical indexes may also be increased by allowing allocations in the cache index translation table to be removed and the physical index placed in the free list, if the currently indexed cache location is no longer in use, or not recently in use. This would allow, for example, in FIGS. 4 and 5, the processing of 6 simultaneous accesses to different memory locations having the same logical index. As can be seen, this option expands the definition of 'spare' physical cache location, would not necessarily require that there be more physical indexes than logical indexes. The efficiencies gained, however, would be substantially reduced.

Before a free physical index is allocated to a new memory block request, a check can be made to determine if this memory block is in the deallocated table. If it is in the deallocated table, the memory block identifier and physical index can be restored in the cache index translation table, and a read of this same memory block into a new cache location can be avoided.

A combination of these alternatives can be utilized as well. For example, by only removing an allocation from the deallocated table when a free index is required, the allocations can be expected to remain in the deallocated table longer. If subsequent requests also include a check of the deallocated table, this extended duration in the deallocated table increases the likelihood of avoiding a read of the same memory block into a new cache location. Similarly, if the allocation is removed from the deallocated table only as required, there would be no need to maintain an explicit free table. When a free index is needed, the deallocated table is scanned for containing the same memory block. If the block is not currently in the deallocated table, the deallocated table is scanned to find an allocation having a cleared in-use flag. If no entries have a cleared in-use flag, the cache index translation table is scanned for an allocation having a cleared in-use flag.

Conventional techniques can be applied to augment this process. For example, the removal of an allocation from the deallocated table can be based upon the conventional "least recently used" algorithm. If an explicit free table is utilized, this technique can be effected by using a first-in first-out (FIFO) architecture for this table.

The foregoing merely illustrates the principles of the invention. It will thus be appreciated that those skilled in the art will be able to devise various arrangements which, although not explicitly described or shown herein, embody the principles of the invention and are thus within its spirit and scope. As would be evident to one of ordinary skill in the art, circuitry, firmware, or software, or any combination may be used to implement the method and apparatus presented herein.

We claim:

1. A method for mapping cache memory, the method comprises the steps of:

a) establishing a first cache logical index corresponding to a first memory address within a first memory block;

b) establishing a first mapping of the first cache logical index with the first memory block and a first physical index of a plurality of physical indexes;

c) establishing at least a second mapping of the first cache logical index corresponding to a second memory address within a second memory block with another of the plurality of physical indexes; and d) maintaining an association of the first memory block and the first physical index of the first mapping.

2. The method of claim 1, further comprising the step of establishing a plurality of mappings of the first cache logical index with a set of the plurality of physical indexes and a set of other memory blocks when an association of the first memory block and the first physical index of the first mapping and an association of the memory block and the physical index of each of the plurality of mappings are to be maintained.

3. The method of claim 1, further comprising the step of identifying the first physical index as available, when the first mapping is no longer needed.

4. The method of claim 3, further comprising the step of establishing a subsequent mapping of a second logical index to the first physical index, after the first physical index is identified as being available.

5. The method of claim 1, further comprising the step of determining when a new memory address corresponds to the first physical index, and establishing the second mapping only when the new memory address does not correspond with the first physical index.

6. The method of claim 1, wherein the cache memory stores at least one of: texel information, pixel information, and z-buffer information.

7. A processing system comprising:

a processing entity that processes data elements;

a memory operably coupled to the processing entity, wherein the memory stores a plurality of data elements within a plurality of memory blocks;

a cache memory operably coupled to the memory and the processing entity, wherein the cache memory temporarily stores selected data elements that have been retrieved from the memory and wherein the cache memory includes storage locations addressable via a plurality of cache physical indexes;

a cache index translation table operably coupled to the processing entity, wherein the cache index translation table includes a plurality of index locations, wherein each index location of the plurality of index locations stores a current mapping of one of the plurality of memory blocks having an associated cache logical index of a plurality of cache logical indexes with an associated cache physical index of the plurality of cache physical indexes, each index location being uniquely identified by its associated cache logical index; and a deallocated table operably coupled to the processing entity, wherein a previous mapping is maintained until the processing entity has retrieved and processed a corresponding data element from the cache memory at the storage location identified by the associated cache physical index of the previous mapping, wherein the previous mapping comprises the associated cache physical index of the previous mapping and a first memory block having a first cache logical index which differs from a second memory block within the cache index translation table having the first cache logical index.

8. The processing system of claim 7, wherein the plurality of cache physical indexes exceeds the plurality of cache logical indexes.

9. The processing system of claim 7, further comprising a cache controller operably coupled to the cache index translation table and the processing entity for receiving a request from the processing entity related to a requested data element within a requested memory block and satisfying the request via an access to the cache memory at the associated physical cache index when the requested memory block is one of the plurality of memory blocks having an associated cache logical index.

10. The processing system of claim 7, further comprising a cache controller operably coupled to the cache index translation table and the processing entity for receiving a request from the processing entity related to a requested data element within a requested memory block and satisfying the request via an access to the cache memory at the associated cache physical index of the previous mapping when the requested memory block is the first memory block of the previous mapping in the deallocated table.

11. The processing system of claim 7, further comprising a free index table for storing at least one cache physical index of the plurality of cache physical indexes, wherein the cache physical index is the associated cache physical index of the previous mapping when the processing entity has retrieved and processed the corresponding data element from the cache memory addressed by the associated cache physical index of the previous mapping.

12. The processing system of claim 11, wherein the one of the plurality of cache physical indexes in the cache index translation table is taken from the free index table.

13. The processing system of claim 7, wherein the memory is operably coupled to the cache memory by a plurality of pipes, and the plurality of cache physical indexes is at least equal to the plurality of cache logical indexes plus the plurality of pipes.

14. The processing system of claim 7, wherein the processing entity is a pipeline processing system, having a plurality of pipeline stages between a data request and a data access, and the plurality of physical indexes is at least equal to the plurality of cache logical indexes plus the plurality of pipeline stages between the data request and the data access.

15. A video graphics processing system comprising:

a memory for storing a plurality of data elements associated with an image, the plurality of data elements being stored in a plurality of memory blocks, each memory block having an associated memory block address, a processing entity which stores and retrieves selected data elements via data request commands and data access commands, and a cache memory access system operably coupled to the processing entity and the memory for processing the data request and data access commands, the cache memory access system including a plurality of cache locations, each cache location of the plurality of cache locations containing a copy of an associated memory block from the plurality of memory blocks, the cache memory access system providing a data path to and from the processing entity from and to the plurality of cache locations, for communicating the selected data elements in response to the data access commands;

wherein:

each memory block of the plurality of memory blocks has an associated logical index of a plurality of logical indexes, the plurality of logical indexes being less than the plurality of memory blocks, such that more than one memory block is associated with each logical index of the plurality of logical indexes, each cache location of the plurality of cache locations has an associated physical index of a plurality of physical indexes, the plurality of cache locations being equal to the plurality of physical indexes, such that each cache location is associated with a unique physical index of the plurality of physical indexes, the cache memory access system further including:

a cache index translation table for storing a mapped memory block address and an allocated physical index for each of the plurality of logical indexes, each of the mapped memory block address and allocated physical index being accessed by each of the plurality of logical indexes, a deallocated table for storing a set of prior mapped memory block addresses and prior allocated physical indexes, a free index table for storing a set of unallocated physical indexes, and a cache controller for controlling and modifying the cache index translation table, the deallocated table, and the free index table, in response to the data request commands, wherein:

the cache controller stores the mapped memory block address and the allocated physical index from the cache index translation table at a first logical index into the deallocated table as one of the set of prior mapped memory block addresses and prior allocated physical indexes when a subsequent one of the data request commands is for a new memory block address having a new logical index equal to the first logical index.

16. The video graphics processing system of claim 15, wherein the cache controller removes one of the set of unallocated physical indexes from the free index table to form a new physical index, and, after storing the mapped memory block address and the allocated physical index to the deallocated table, the cache controller stores the new memory block address and the new physical index into the cache index translation table at the first logical index thereby replacing the mapped memory block address and allocated physical index at the first logical index.

17. The video graphics processing system of claim 15, wherein the cache controller removes one of the set of prior mapped memory block addresses and prior allocated physical indexes after the data access commands associated with the one of the set of prior mapped memory block addresses is completed, and thereafter places the one of the set of prior allocated physical indexes into the free index table as one of the set of unallocated physical indexes.

18. The video graphics processing system of claim 15, wherein the memory includes a plurality of data pipes, and the plurality of cache locations is equal to or greater than the plurality of logical indexes plus the plurality of data pipes.

19. The video graphics processing system of claim 18, wherein the plurality of data pipes is equal to or greater than 16.

20. The video graphics processing system of claim 15, wherein the processing entity is a pipeline processing entity comprising a plurality of pipeline stages with a determined number of pipeline stages between a first data request for a first data element and a corresponding first data access to the first data element, and wherein the plurality of cache locations is equal to or greater than the plurality of logical indexes plus the determined number of pipeline stages between the first data request and the first data access.

* * * * *